United States Patent [19]

Harasaki et al.

[11] Patent Number: 4,669,777
[45] Date of Patent: Jun. 2, 1987

[54] FRONT BODY STRUCTURE FOR FRONT ENGINE TYPE MOTOR VEHICLE

[75] Inventors: Hayatsugu Harasaki; Koichi Yoshizane, both of Hiroshima, Japan

[73] Assignee: Mazda Motor Corporation, Hiroshima, Japan

[21] Appl. No.: 854,592

[22] Filed: Apr. 22, 1986

[30] Foreign Application Priority Data

Apr. 23, 1985 [JP] Japan ................................ 60-87739
Apr. 23, 1985 [JP] Japan ................................ 60-87740
Apr. 27, 1985 [JP] Japan ............................ 60-63459[U]

[51] Int. Cl.⁴ ............................................. B62D 25/02
[52] U.S. Cl. ...................................... 296/194; 296/189
[58] Field of Search ................... 296/194 X, 188, 189

[56] References Cited

U.S. PATENT DOCUMENTS

| 4,264,101 | 4/1981 | Gotoh | 296/194 |
| 4,466,653 | 8/1984 | Harasaki | 296/194 |
| 4,466,654 | 8/1984 | Abe | 296/194 |
| 4,469,368 | 9/1984 | Eger | 296/194 |
| 4,545,612 | 10/1985 | Harasaki | 296/194 |
| 4,560,198 | 12/1985 | Katano et al. | 296/194 |

FOREIGN PATENT DOCUMENTS 543452 2/1974 Japan .
55-114772 8/1980 Japan .

Primary Examiner—Robert R. Song
Attorney, Agent, or Firm—Fleit, Jacobson, Cohn & Price

[57] ABSTRACT

A vehicle body front structure including a wheel apron extending forward from a hinge pillar and having a front end connected with the radiator shroud. A wheel apron reinforcement structure comprises an inner panel member and an outer panel member. The inner panel member extends between the hinge pillar and the radiator shroud 7 and connected to the wheel apron. The outer panel member is connected to the inner member to form a structure of closed cross-section which extends from the hinge pillar to a position rearward the radiator shroud. The structure of closed cross-section has a height which increases toward rearward.

14 Claims, 12 Drawing Figures

FRONT BODY STRUCTURE FOR FRONT ENGINE TYPE MOTOR VEHICLE

BACKGROUND OF THE INVENTION

1. Field of the Invention

The present invention relates to a motor vehicle front body structure and more particularly to a vehicle front body structure having a front engine compartment.

2. Description of the Prior Art

In a motor vehicle body having an engine compartment located forward the passanger compartment, side walls of the engine compartment are constituted by wheel aprons which extend forward from front hinge pillars. The front ends of the wheel aprons are connected to the opposite ends of a transversely extending radiator shroud. The wheel apron is provided at the transversely inner side with a suspension tower for receiving an upper end of a suspension strut assembly. In order to provide the wheel apron with a sufficient strength and rigidity, it has been known to form longitudinally extending frame structures of closed cross-section along upper and lower portions of the wheel apron. Examples of such front body structure are shown by Japanese utility model application No. 54-14604 which has been filed on Feb. 6, 1979 and disclosed for public inspection on Aug. 13, 1980 under the disclosure number 55-114772.

SUMMARY OF THE INVENTION

It is an object of the present invention to provide a motor vehicle front body structure having a wheel apron reinforced by a longitudinally extending reinforcement with further means for reinforcing the connection between the wheel apron and the radiator shroud.

Another object of the present invention is to provide a front body structure wherein the wheel apron is reinforced so that the structure forming the engine compartment is gradually collapsed from the forward end portion in case of a crash of the vehicle body.

According to the present invention, the above and other objects can be accomplished by a motor vehicle front body structure including a pair of wheel aprons, each extending forward from a hinge pillar to define a side wall of an engine compartment, a substantially transversely extending radiator shroud having opposite ends which are connected respectively to front ends of said wheel aprons, a wheel apron reinforcement structure provided on an outer side of each wheel apron to extend between and connected with said hinge pillar and said radiator shroud, said wheel apron reinforcement structure including a portion of closed cross-section which extends from said hinge pillar forward to a longitudinal position spaced apart rearward from said radiator shroud by a predetermined distance, said portion of closed cross-section being increased in height toward rearward.

According to a preferable aspect of the present invention, the wheel apron reinforcement structure comprises a reinforcement inner panel extending between the hinge pillar and the radiator shroud and having a front end portion connected with the radiator shroud, and a reinforcement outer panel extending between the hinge pillar and said longitudinal position and connected with said reinforcement inner panel to form said portion of closed cross-section. The wheel apron reinforcement structure is connected at the front end with the radiator shroud so that the connection between the wheel apron and the radiator shroud is reinforced by this structure. Since the wheel apron reinforcement is not of a closed cross-section between the radiator shroud and the aforementioned longitudinal position, this portion is at first collapsed under the shock load in crash to thereby absorb the shock load. In case where the shock load cannot be fully absorbed by the collapsing of the aforementioned portion, the remaining portion of the wheel apron reinforcement structure is then collapsed. Since the height of the reinforcement structure is gradually increased toward rearward, the collapsing is gradually proceeded toward rearward.

The above and other objects and features of the present invention will become apparent from the following description of a preferred embodiment taking reference to the accompanying drawings.

DESCRIPTION OF THE PREFERRED EMBODIMENT

Figure 1:
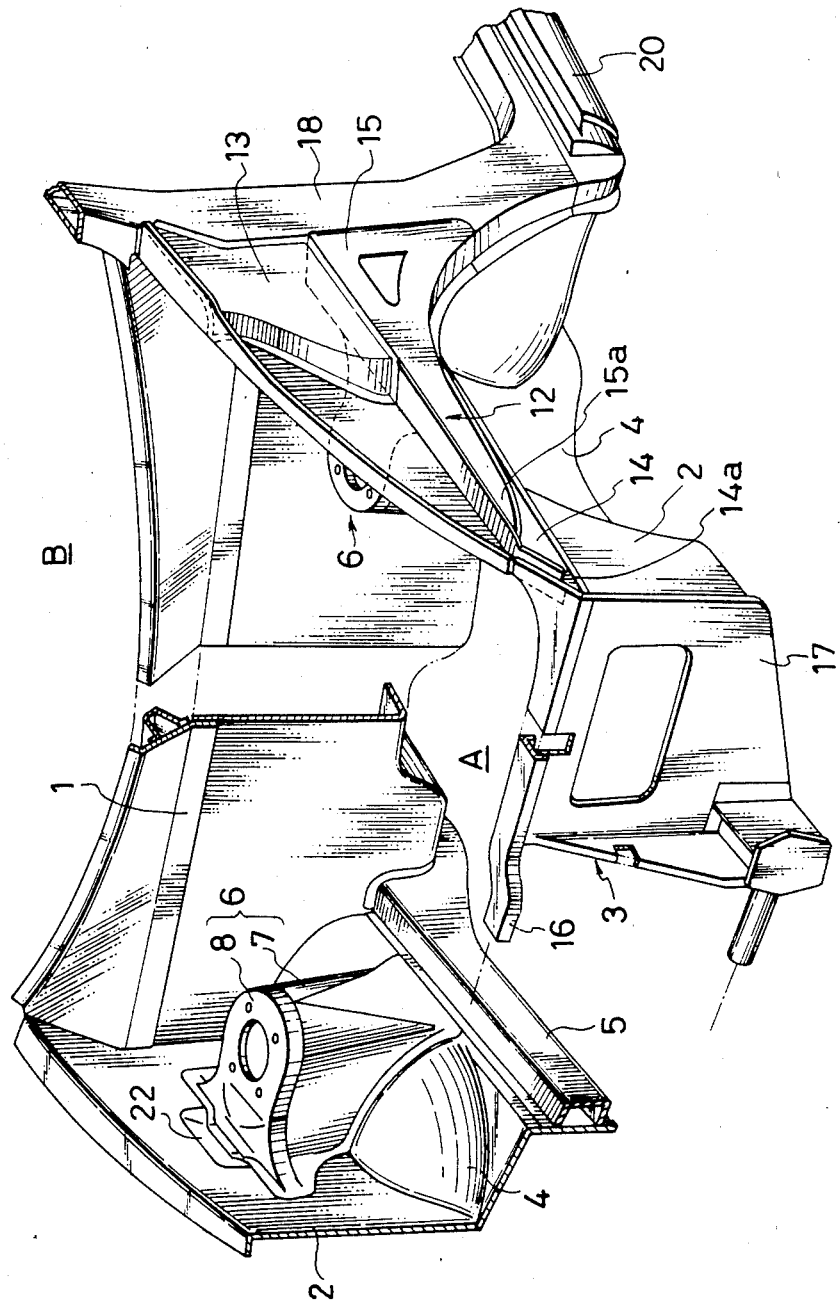
FIG. 1 is a fragmentary perspective view of a motor vehicle front body structure embodying the features of the present invention.
Figure 4:
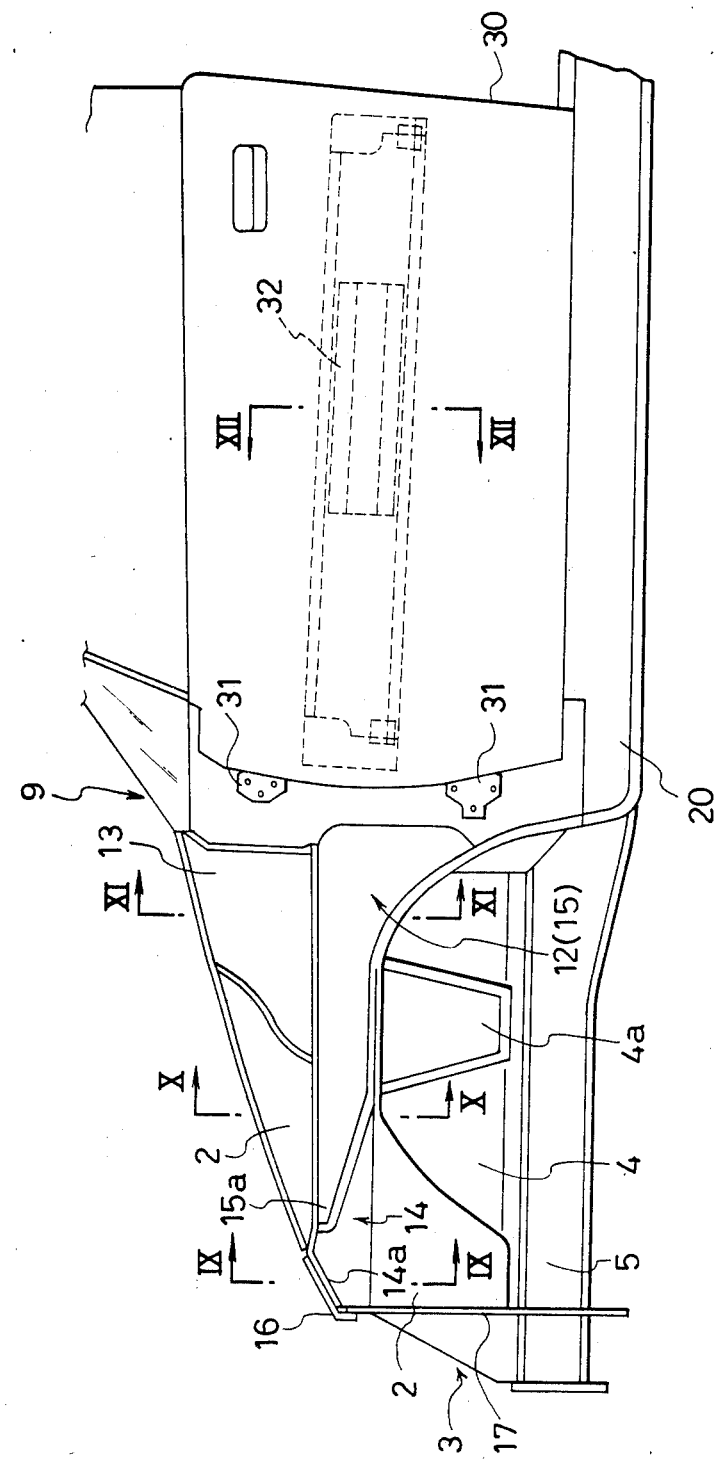
FIG. 4 is a side view of the side structure as seen from the outside.

Referring to the drawings, particularly to FIG. 1, there is shown a motor vehicle front body structure including a dash panel 1 which separates the front engine compartment A from the rear passenger compartment B. Each end of the dash panel 1 is connected with a front door hinge pillar 18 of a closed cross-section as well known in the art. As shown in FIG. 4, the hinge pillar 18 is upwardly extended to form a front pillar 19. The lower end of the hinge pillar 18 is connected with a rearwardly extending side sill 20 which is also well known in the art. The hinge pillar 18 and the front pillar 19 define a front periphery of a side door opening and the side sill 20 define a lower periphery of the side door opening. A side door 30 is provided in the door opening and connected with the hinge pillar 18 by means of hinges 31.

Figure 8:
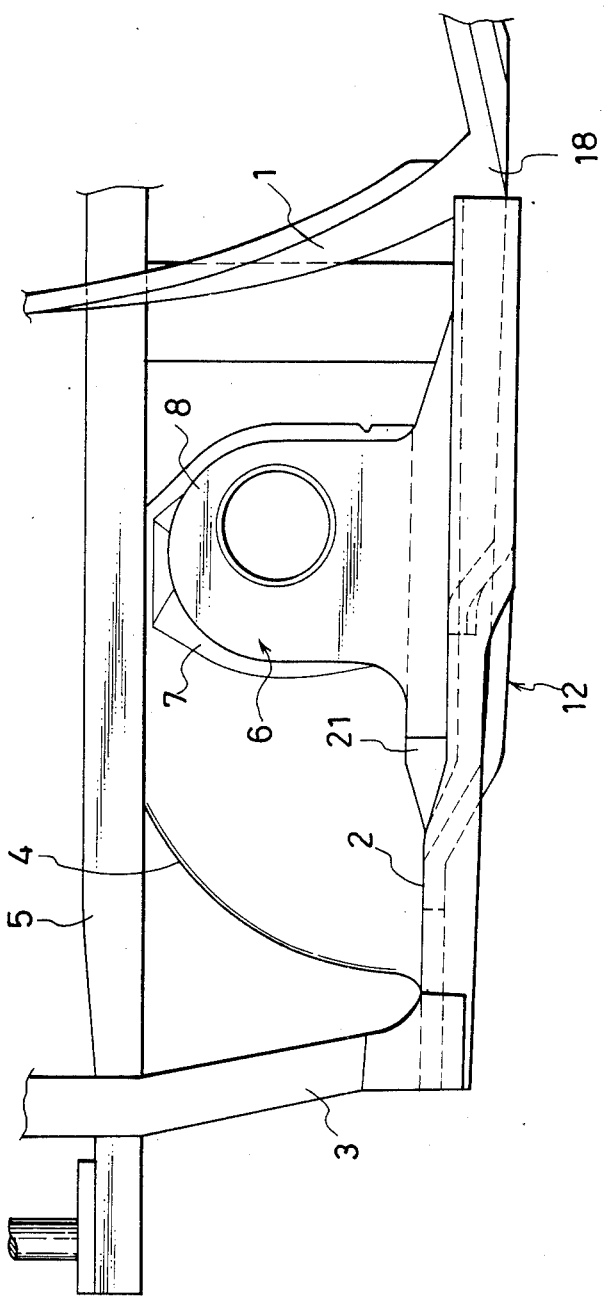
FIG. 8 is a top plan view of the side structure.

Referring again to FIG. 1, it will be noted that the structure shown therein further includes a wheel apron 2 at each side. The wheel apron 2 is connected at the rear end with the hinge pillar 18 and extends forward from the hinge pillar 18 to define a side wall of the engine compartment A. Between the front ends of the wheel aprons 2 at the opposite sides of the structure, there is a transversely extending radiator shroud 3 which defines a front wall of the engine compartment A. As shown in FIGS. 1 and 8, the front end of the wheel apron 2 is connected with the upper portion of each end of the radiator shroud 3.

Figure 5:
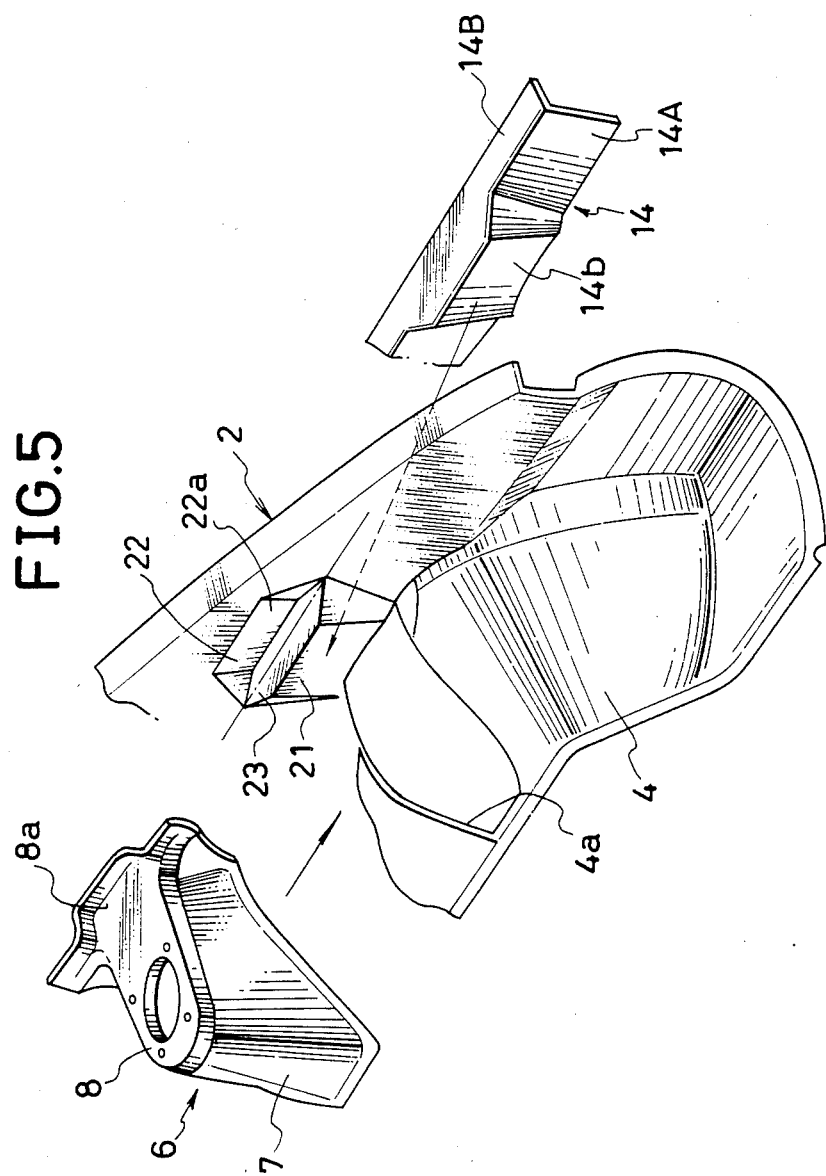
FIG. 5 is an exploded perspective view of the structural components in the side structure.

The wheel apron 2 is formed with a wheel arch 4 which bulges inward into the engine compartment A to provide a room for a front wheel (not shown) outside the wheel apron 2. Along the lower edge, the wheel apron 2 is provided with a front frame 5 which is of a channel-shaped cross-sectional configuration and welded at the opposite side edges to the lower edge portion of the wheel apron 2 to form a structure of closed cross-section. As shown in FIG. 5, the wheel apron 2 is formed with a cutout 4a at the top portion of the wheel arch 4 and a suspension tower 6 is connected with the wheel apron 2 to cover the cutout 4a.

Figure 2:
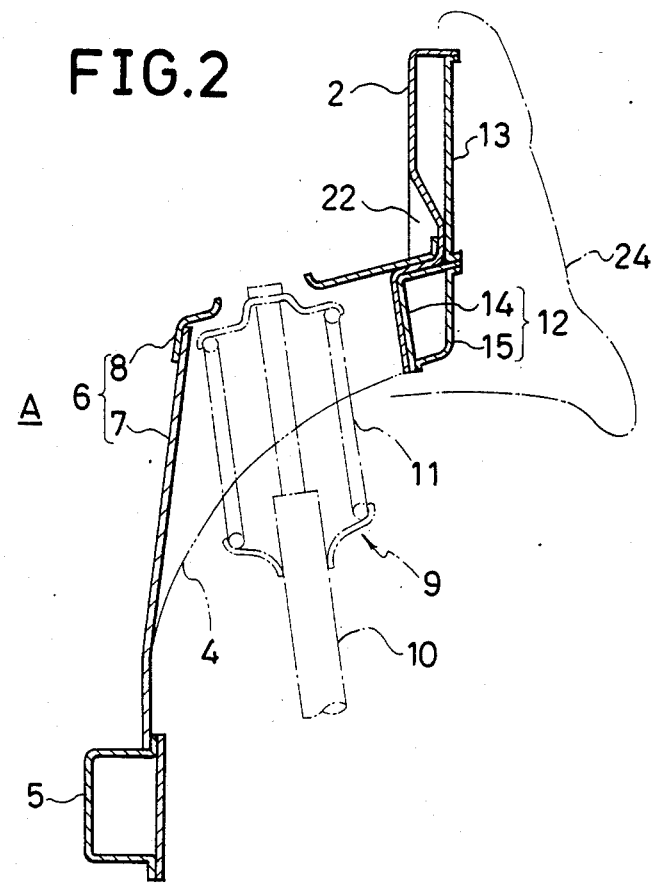
FIG. 2 is a sectional view taken along a transverse vertical plane passing through the suspention tower.

As shown in FIG. 5, the suspension tower 6 comprises a side wall 7 and a top wall 8 which are connected together and the top wall 8 is adapted to receive, as shown in FIG. 2, the top end of a suspension strut assembly 9 which extends upward through the cutout 4a in the wheel apron 2. In FIG. 2, it will be noted that the suspension strut assembly 9 is shown as including a damper strut 10 and a coil spring 11.

Figure 6:
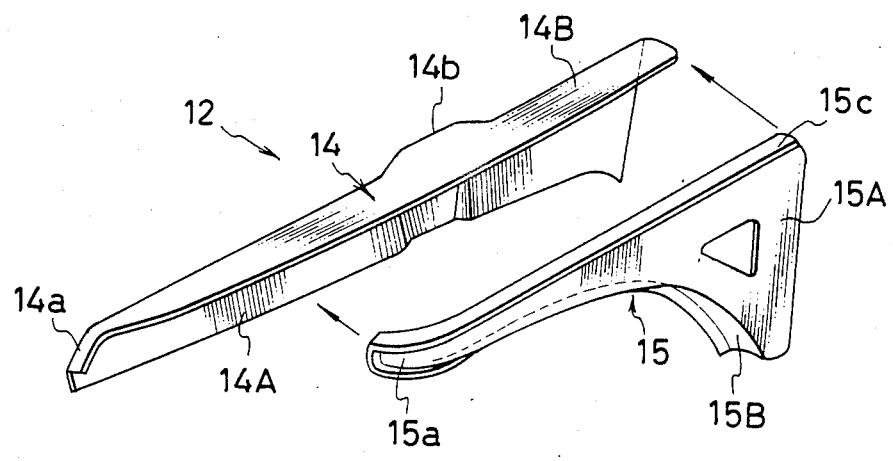
FIG. 6 is an exploded perspective view of the wheel apron reinforcement structure.
Figure 9:
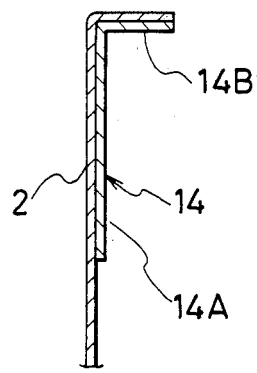
FIG. 9 is a sectional view taken along the line IX—IX in FIG. 4.
Figure 10:
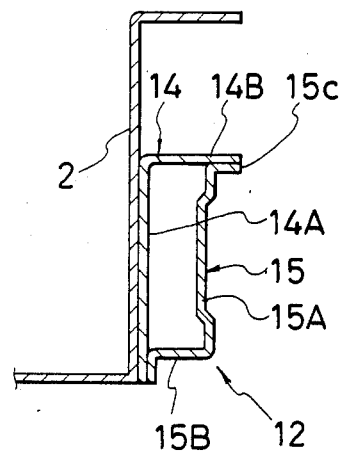
FIG. 10 is a sectional view taken along the line X—X in FIG. 4.
Figure 11:
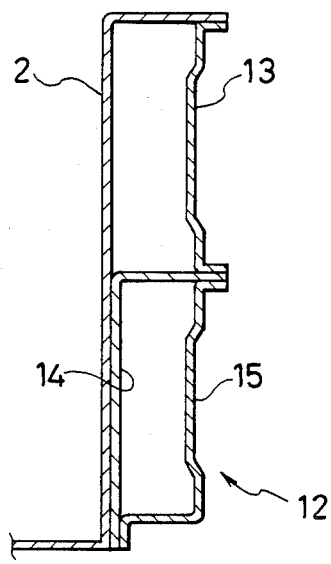
FIG. 11 is a sectional view taken along the line XI—XI in FIG. 4.

At the upper portion, the wheel apron 2 is provided with a wheel apron reinforcement 12 and an upper reinforcement 13 as shown in FIGS. 1 and 4. As shown in FIG. 6, the wheel apron reinforcement 12 includes an inner reinforcement member 14 and an outer reinforcement member 15. The inner member 14 is substantially of an L-shaped cross-section having a vertical leg 14A and a transversely outwardly extending flange 14B which is contiguous to the upper edge of the vertical leg 14A. The inner member 14 extends between the hinge pillar 18 and the radiator shroud throughout the length of the wheel apron 2 so that the lower edge of the vertical leg 14A is located substantially at the level of the top of the wheel arch 4. The inner member 14 is welded at the vertical leg 14A to the wheel apron 2 as shown in FIGS. 9, 10 and 11.

As shown in FIG. 1, the radiator shroud 3 includes an upper frame member 16 and a head lamp panel 17 which are connected to the front end of the wheel apron 2. The inner member 14 of the wheel apron reinforcement 2 extends to the portion where the upper frame member 16 of the radiator shroud 3 is connected to the wheel apron 2. The inner member 14 has a front end 14a which is connected to the upper frame member 16 of the radiator shroud 3. It will therefore be understood that the connection between the radiator shroud 3 and the wheel apron 2 is reinforced by the inner member 14 of the wheel apron reinforcement 12.

The outer member 15 of the wheel apron reinforcement 12 is of a substantially Z-shaped cross-section having a vertical wall 15A, a transversely inwardly extending lower flange 15B and a transversely outwardly extending upper flange 15C. The outer member 15 extends forward from the rear end of the inner member 14 and connected to the inner member 14 by being welded at the edge portion of the lower flange 15B to the vertical wall 14A of the inner member 14 and at the upper flange 15C to the flange 14B of the inner member 14. Thus, a reinforcement structure of closed cross-section is formed by the inner member 14 and the outer member 15 of the wheel apron reinforcement 12. The members 14 and 15 are connected at the rear ends to the hinge pillar 18.

Figure 7:
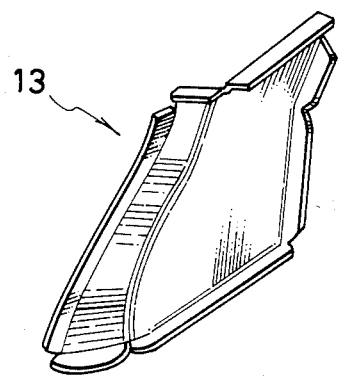
FIG. 7 is a perspective view of the rear upper reinforcement.

The upper reinforcement 13 is of a configuration as shown in FIG. 7 and located above the wheel apron reinforcement 12 at the rear portion of the wheel apron 2. The reinforcement 13 is connected to the wheel apron 2, to the flange 14B of the inner member 14 of the wheel apron reinforcement 12 and to the hinge pillar 18 to thereby reinforce the rear upper portion as shown in FIG. 11. The wheel apron 2 has a height which increases toward rearward and the reinforcement 13 is correspondingly increased in height toward rearward. Further, the reinforcement 13 has a front end portion which is tapered toward forward. The front end of the reinforcement 13 is located forward the suspension tower 6 so that the load from the suspension strut 9 is supported by the reinforcement 13.

Figure 3:
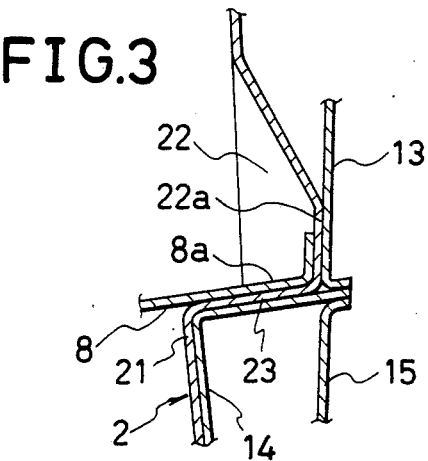
FIG. 3 is an enlarged sectional view showing the arrangement of the wheel apron reinforcement structure in the vicinity of the suspension tower.

In FIGS. 3, 5 and 8, it will be noted that the wheel apron 2 is formed at a portion above the wheel arch 4 with an inward projection 21 which continues at the upper end through a wall 23 to an outward projection 22. The inner member 14 of the wheel apron reinforcement 12 is formed with an inward projection 14b which corresponds in configuration with the inward projection 21 on the wheel apron 2 and is fitted to the recess formed in the wheel apron 2 by the inward projection 21. The top wall 8 of the suspension tower 6 has an outward extension 8a which is laid on the wall 23 and connected to the wheel apron 2 together with the inner member 14 of the wheel apron reinforcement 12 and the upper reinforcement 13 as shown in FIG. 3. The outer side of the wheel apron 2 is covered by a front fender 24.

Figure 12:
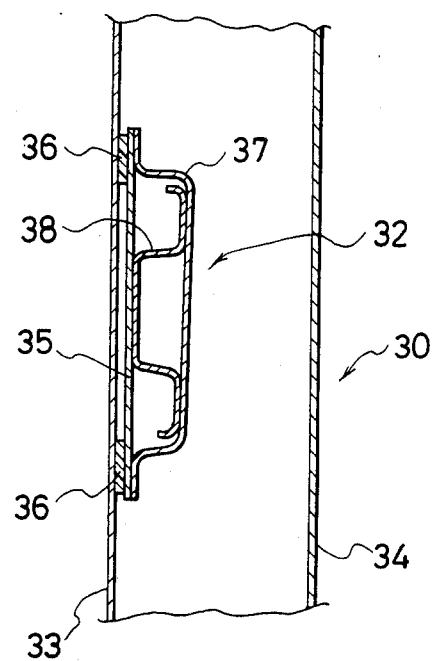
FIG. 12 is a sectional view taken along the line XII—XII in the FIG. 4.

In FIG. 4, it will be noted that the side door 30 is provided with a longitudinally extending impact bar structure 32 for reinforcing the door 30 against a longitudinal force. As shown in FIG. 12, the side door 30 includes an outer panel 33 and an inner panel 34. The impact bar structure 32 includes a flat member 35 attached to the outer panel 33 through spacing members 36 and a hat shaped member 37, the members 35 and 37 being connected together to form a structure of closed cross-section. Between the members 35 and 37, a reinforcement 38 is located. It will be noted in FIG. 4 that the impact bar structure 32 is located at a heightwise level substantially the same as that of the wheel apron reinforcement 12.

It will further be noted in FIG. 4 that the front end 15a of the outer member 15 of the wheel apron reinforcement 12 is located at a position rearwardly spaced from the radiator shroud 3 and the height of the member 15 is gradually increased toward rearward. In case where the car has crashed at the front end, therefore, the wheel apron 2 is collapsed at first at the front end portion where only the inner member 14 is provided for reinforcement. Where the shock load is large so that the load is not absorbed only by the collapsing of the front portion, the wheel apron reinforcement 12 starts to be collapsed at the front end portion of the outer member 15 and the collapsing gradually progresses toward rearward depending on the shock load. The shock load is then transmitted through the impact bar structures 32 in the side doors 30 to the rear body so that deformation of the passenger compartment can be suppressed to minimum.

The invention has thus been shown and described with reference to a specific embodiment, however, it should be noted that the invention is in no way limited to the details of the illustrated structures but changes and modifications may be made without departing from the scope of the appended claims.

We claim:

1. A motor vehicle front body structure including a pair of wheel aprons, each extending forward from a hinge pillar to define a side wall of an engine compartment, a substantially transversely extending radiator shroud having opposite ends which are connected respectively to front ends of said wheel aprons, a wheel apron reinforcement structure provided on an outer side of each wheel apron to extend between and connected with said hinge pillar and said radiator shroud, said wheel apron reinforcement structure including a portion of closed cross-section which extends from said hinge pillar forward to a longitudinal position spaced apart rearward from said radiator shroud by a predetermined distance, said portion of closed cross-section being increased in height toward rearward.

2. A front body structure in accordance with claim 1 in which said wheel apron reinforcement structure includes an inner panel member and an outer panel member which are connected together to form said portion of closed cross-section.

3. A front body structure in accordance with claim 2 in which one of said inner and outer panel members has a front end extending beyond the other and connected with said radiator shroud.

4. A front body structure in accordance with claim 2 in which said inner and outer panel members are connected with the hinge pillar.

5. A front body structure in accordance with claim 3 which further includes a second reinforcement which extends between the hinge pillar and a portion spaced rearward from a front end of the other panel member, said second reinforcement being connected to the wheel apron to form a structure of closed cross-section.

6. A front body structure in accordance with claim 2 in which said wheel apron is formed with a transversely inward projection defining a transversely outwardly opened recess, said inner panel member of the wheel apron reinforcement being formed with a transversely inward projection which is fitted to said recess in the wheel apron.

7. A front body structure in accordance with claim 6 in which said wheel apron is formed at a position above said inward projection with a transversely outward projection defining a transversely inwardly opened recess, a suspension tower provided on a wheel arch in the wheel apron to be connected with an upper end of a suspension assembly, said suspension tower being formed with a transversely outward extension which is fitted to the transversely inwardly opened secess in the wheel apron.

8. A front body structure in accordance with claim 2 in which said outer panel member in the wheel apron reinforcement structure has a front end portion which is of a forwardly tapered configuration.

9. A front body structure in accordance with claim 5 in which said second reinforcement has a rear end portion connected with said hinge pillar.

10. A front body structure in accordance with claim 5 in which said second reinforcement is of a configuration having a hight decreasing toward a front end.

11. A front body structure in accordance with claim 5 in which said second reinforcement has a front end portion which extends beyond a longitudinal location where a suspension tower is provided on the wheel apron.

12. A front body structure in accordance with claim 5 in which said wheel apron includes a rear portion which has a height increasing toward rearward, said second reinforcement being correspondingly increased in height toward rearward.

13. A motor vehicle body structure including a front body structure and a pair of side doors, said front body structure including a pair of wheel aprons, each extending forward from a hinge pillar to define a side wall of an engine compartment, a substantially transversely extending radiator shroud having opposite ends which are connected respectively to front ends of said wheel aprons, a wheel apron reinforcement structure provided on an outer side of each wheel apron to extend between and connected with said hinge pillar and said radiator shroud, said wheel apron reinforcement structure including an inner panel member and outer panel member which are connected together to form a structure of closed cross-section, said inner and outer panel members being connected at rear ends to said hinge pillar and increasing in height toward rearwards, one of said inner and outer panel members being extended beyond the other and connected with the radiator shroud, said side door being attached at a front edge portion to said hinge pillar, said side door being provided with a longitudinally extending reinforcing structure which is substantially in alignment in a longitudinal direction with said wheel apron reinforcement structure.

14. A vehicle body structure in accordance with claim 13 which further includes a third reinforcement extending between the hinge pillar and a portion spaced rearward from a front end of said outer panel member.

* * * * *